J. M. LONG.
CULTIVATOR.
No. 189,896.  Patented April 24, 1877.
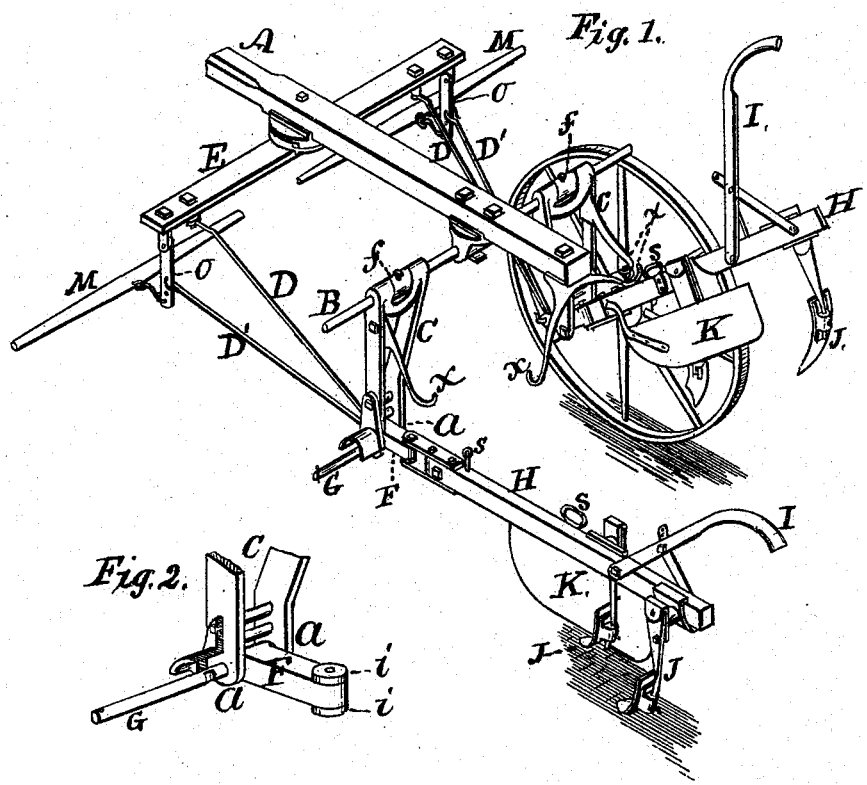

UNITED STATES PATENT OFFICE.

JOHN M. LONG, OF HAMILTON, OHIO.

IMPROVEMENT IN CULTIVATORS.

Specification forming part of Letters Patent No. 189,896, dated April 24, 1877; application filed May 31, 1876.

*To all whom it may concern:*

Be it known that I, JOHN M. LONG, of Hamilton, in the county of Butler and State of Ohio, have invented a new and useful Improvement in Cultivators; and I do hereby declare that the following is a full, clear, and exact description thereof, reference being had to the accompanying drawings, and to the letters of reference marked thereon.

Figure 1 is a perspective view of my new implement, with one of the carrying-wheels removed. Fig. 2 is a perspective view of a detached portion of the same, exhibiting the axle-arm, and a part of its connecting-frame, and the hinged draft-block, to which the front end of the plow-beam is connected, as shown in Fig. 1.

This improvement in agricultural implements is more particularly designed for cultivating corn during the different stages of its growth, and therefore has its frame, which is carried by two wheels, elevated so as to pass over a row of corn, on each side of which one of the carrying-wheels and one of the horses of the team will travel; and the machine is so organized as not only to permit each plow-beam to work freely upon a pivotal connection, vertically and laterally, at the point of draft, but it is also constructed so that each plow or set of cultivators works independently, and is propelled entirely by the horse behind which it is secured.

To effect these objects, the frame of the machine is united partly by rigid and partly by flexible joints—that is to say, that part of the main frame consisting of the tongue A and axle-shaft B is rigid, and the other parts, consisting of the axle-arm supports C, draft-bars D' D', and double-tree E, are flexibly connected together and to the rigid portion of the frame, as hereinafter more fully described.

By this construction and arrangement each carrying-wheel, together with the plow or set of shovels immediately in connection and in line with each other, will partake of the same vertical movements, and be uniformly propelled independently of the vertical and lateral movements of the other carrying-wheel and plow.

The tongue A is rigidly connected to axle-shaft B, to which the axle-arm supports C are hinged. Between the lower ends of the branches *a a* of the arm-supports C the draft block or coupling F is secured by a pivot-bolt, extending in line with axle-arm G. The beams H are provided with handles I and adjustable shovels or plows J, and their front ends have projecting plates bolted to them, through which a pivot-bolt passes vertically, connecting the front end of the beam with the rear end of the hinged coupling-block F. The washers *i i* are used to adjust the front end of the plow-beam vertically, to cause the plowing to be either deeper or shallower, as may be required. The fenders K, attached to the plow-beams, are to prevent the small growing corn from being broken down by clods and from being covered with earth. The loops *s s* upon the plow-beams are for the purpose of hanging up the plows upon hooks *x x*, fastened to the rear end of the tongue A, or to the arm-supports C, when the implement is being moved from place to place and when turning. Stay-rods D are pivoted at each end, connecting the double-tree E with the horizontal bolts, which secure the coupling-blocks F with the axle-arm supports C. The pivot-bolts upon which the stay-rods D work are at right angles to each other, to allow freedom and flexibility to the frame.

The draft-bars D' connect (with hooks at their rear ends) with holes made in the stays D, near the front ends of the coupling-blocks F, and their front ends connect, by hooks, with the pendent couplings *o*, which are hinged under the ends of the double-tree E. The single-trees M connect with the lower ends of couplings O, by which arrangement the draft of the team will be in a line below the level of the tongue A, which will relieve the necks of the horses from its weight. A series of holes is made through couplings O for the purpose of vertical adjustment of draft-bars D', whereby the line of draft from the horse's shoulder to the plow may be altered as circumstances may require. The plow-beams H, with their cultivator-shovels, may be transposed, and different kinds of shovels or plows may be substituted, so as to plow the earth either from or toward the rows of corn; and by means of the adjustable sleeves *f f*, which are secured by set-screws upon shaft B, the frame may be adjusted so as to bring the plow-beams, with their respective cultivator-shovels, nearer together, or the reverse, as will be found necessary to plow nearer to or farther from the rows of corn. As the plow-beams and carrying-wheels are both connected to their respective supports C in the manner described, the lateral adjustment of the supports C upon shaft B will necessarily cause a corresponding lateral adjustment of the carrying-wheels, and the draft-connection of bars D' in front of the coupling-blocks F.

In using my improved cultivator, the attendant will walk upon the ground, grasping one of the plow-handles I in each hand, and, because of the right-angular hinges at front and rear of the coupling-block, the attendant will have complete control of the plows, to govern their direction, as well as the depth of their work; and any irregularities of the team in propelling the implement will not injuriously affect the operation, for the reason that the rigid portion of the frame only serves to guide or govern the direction of the machine, while its flexible connections permit the plows to be propelled and governed independently in a practical sense.

I claim as my invention—

1. The frame consisting of rigidly-connected parts A B, in combination with flexibly-connected parts C E D' O and stay D, substantially as and for the purpose described.

2. The combination of the draft-bar D' and stay D with coupling O and double-tree E, as and for the purpose specified.

3. The hinged coupling-block F, in combination with pivoted axle-arm supports C, draft-bar D', stay D, double-tree E, and plow-beam H, as and for the purpose described.

4. In combination with the upper branches of pivoted axle-supports C and shaft B, the collar $f$, with its set-screw for laterally adjusting the plows and carrying-wheels, in the manner and for the purpose specified.

Witness my hand this 25th day of May, A. D. 1876.

JOHN M. LONG.

Witnesses:
ISAAC J. GRAHAM,
H. P. K. PECK.